United States Patent Office 3,097,912
Patented July 16, 1963

3,097,912
HAIR AND WOOL DEPILATION METHOD AND COMPOSITION
Henry Booth, 165 Radley Road,
Abingdon-on-Thames, England
No Drawing. Filed Mar. 30, 1959, Ser. No. 802,611
13 Claims. (Cl. 8—94.16)

This invention relates to compositions for the dehairing or removal of hair or wool from animal skins by painting the flesh side of the skin with a composition, and for the subsequent treatment of such skins prior to tanning.

The invention is especially, but not exclusively, concerned with the dewooling of sheepskins.

It is known to brush or spray the flesh side of the skin with a "paint" consisting of a mixture of sodium sulphide ($Na_2S$) and/or sodium hydrosulphide (NaHS) and lime (CaO) or hydrated lime ($Ca(OH)_2$) in water in the desired concentration, with or without an inert filler to produce the required consistency, and to use a paint containing calcium hydrosulphide ($Ca(HS)_2$) and lime or hydrated lime with or without an inert filler. It is also known that to obtain good depilation of the skin with sodium sulphide, the pH of the skin at the hair root must be above 11.0.

If sodium sulphide alone is used with an inert thickener instead of lime the sulphide oxidises too quickly to produce an adequate loosening of the wool, and at the same time the requisite alkalinity for loosening the wool may disappear also.

I have observed that the rate of oxidation of alkaline soluble sulphide solution is rapid at the start and diminishes with time, is greater with increasing alkalinity and that at the finish the rate is extremely slow. The reason for this decrease in rate is that iron present in the chemicals and skins acts as a promoter to the oxidation and that sodium sulphite is formed with loss of alkalinity and the sulphite inhibits the activity of the iron and apart from this the lower alkalinity reduces the rate of oxidation. The oxidation takes place rapidly in the presence of lime and the reaction of any sulphite produced to form caustic soda and insoluble calcium sulphite on the surface of the skin is liable to soften the grain surface of the skin thus making it very sensitive to subsequent abrasion, or else it sets the natural wrinkles in the skin, which is undesirable.

Sodium sulphite in alkaline solution is very resistant to oxidation, and by adding it to alkaline sodium sulphide, the rate of oxidation of the latter, particularly in the presence of large quantities of air, as can occur in fellmongering, is greatly reduced and there is no loss of alkalinity due to the oxidation. The use of a mixture of sodium sulphite and sulphide with an inert filler does not, however, produce good depilation, as the alkalinity of this mixture even with saturated solutions is often insufficient to produce good pulling.

To achieve satisfactory depilation sufficient extra alkali must be added to make good this deficiency. If however, lime is used the sulphite reacts with the lime to form calcium sulphite and caustic soda, and this causes similar damage to the skin to that produced with lime/sodium sulphide paints without added sulphite.

Wool badly contaminated with a lime sulphide paint in the wet state is destroyed, but if the wool is dried and the sulphide oxidises and therefore ceases to act as an accelerator for the attack of the alkali on the wool, the paint will dry to a white powder which may be staken off leaving the residue of the wool saleable but damaged. The oxidation occurs with a lime sulphide paint because the calcium ions present help in the oxidation of the sulphide as the wool is being dried by converting any sulphite formed into insoluble calcium sulphite, so that the action of any iron present as a promoter of the oxidation is not inhibited.

In the absence of a promoter for the oxidation of the sulphide, and particularly if the alkalinity of the paint is low, the sulphide in the paint will only oxidise slowly, and contaminated wool would be attacked in the drying and reduced to a useless sticky mass.

It will be seen, therefore, that the paint should be such that the sulphide will be prevented from oxidising too rapidly in the skin so that it may assist in dissolving the hair roots in the skin but that the sulphide in paint which may get on the wool should be rapidly oxidized so that the wool is not attacked.

The object of the present invention is to achieve satisfactory depilation with the minimum amount of damage to the skin or to the wool or hair, and where crossbred skins of good quality are being dewooled to use such a paint as will have at the same time the optimum effect in preparing the skins for the subsequent tanning process.

According to the invention a composition for the dewooling of sheepskins or the dehairing of skins comprises a substantially lime free, water soluble alkali, a relatively small amount of a water soluble sulphide as an accelerator for the alkali, an inhibitor for the oxidation of the sulphide and a promoter for the oxidation of the sulphide, the inhibitor being such that it will diffuse with the sulphide through the skin and thus be active at the hair root and the promoter being such that it is incapable of diffusion through the skin and therefore is active only on the surface, that is, on any wool that is accidentally contaminated with the paint.

A suitable inhibitor is sodium sulphite and a suitable promoter is active iron, which may be in the form of ferric oxide. China clay contains an appreciable quantity of iron and therefore serves a dual purpose as thickener and promoter. A suitable alkali is caustic soda.

If iron is used as a promoter it must be in an active form (e.g. finely divided) which will show by turning the paint greenish blue.

If the promoter is not incorporated in a thickener a separate thickener may be used in the paint, for example insoluble calcium carbonate, with the addition of starch or other similar material which gelatinises in alkaline solutions.

It has been found when using a mixture of caustic soda, sodium sulphide, sodium sulphite and a thickener containing say ¼ to ½% of ferric oxide, and when the sodium sulphide concentration is, say, below 3% (100% material) that there is sufficient alkalinity to attack the wool or hair root, but if the wool or hair is contaminated with the paint it is substantially undamaged after drying, in addition by the use of caustic soda and sodium salts without lime, the wool can be scoured with greater ease.

The best composition of the paint to use will depend on the fineness of the wool, and the quality and freshness of the skin.

The treatment of skins with alkali in addition to the removal of wool or hair, serves to free the collagen from unwanted protein and other matter, and to reduce the crystalline proportion of the fibres so that they can absorb a larger amount of tanning material and so produce a fuller, plumper leather.

In addition to achieving satisfactory depilation, this invention by the use of the most suitable paint combined with the correct alkaline treatment after dewooling for achieving the above material results produces a pelt which will give a better quality and more uniform finished leather in any tannage as compared with skins with paints containing lime or hydrated lime.

With finer wooled skins of the merino type or where the skin is of little relative value due to staleness or other damage, the use of the lowest concentration of caustic soda and sulphide that will produce easy dewooling should be employed, but with fresh crossbred skins (56s and coarser wool) the strength of the paint should be considerably greater than that needed to produce satisfactory dewooling as the use of such paints facilitates the production of a plump full leather. For this purpose it is necessary to use such a proportion of sodium sulphide to caustic soda that the alkalinity of the paint is restrained by the buffering action of the sulphide, as otherwise, unless the skins are very fresh, the alkali will cause the skins to swell in the painted condition, and this swelling will hold the wool or hair, so that it cannot easily be removed from the skin, although the roots have been destroyed. The proportion below which the sulphide should not go is 2 parts sodium sulphide crystals (30%) or 1 part 60% for 2 parts of 98/100% caustic soda.

To avoid damage to the wool using stronger paints it is desirable to either use a weaker paint for the thinner parts of the skins and in particular the bellies where most contamination of the wool can occur, and a stronger paint for the neck and the strip down the middle of where the skin is thickest, or to use a medium strength paint thickened with a very finely divided colloidal china clay (particle size 50% less than 1 micron) as then the paint can be applied thickly to the thicker parts of the skin without difficulties due to its dripping off the skin, which will happen with less finely divided thickeners.

Examples of paints in accordance with the invention to be used where the wool is dried without washing are as follows:

| | |
|---|---|
| Caustic soda (100%) | ¾–2 lbs. |
| Sodium sulphide (60%) | Half the above amount of caustic soda. |
| Sodium sulphite (100%) | 1–2 ozs. |
| China clay | 4–6 lbs. |
| Water | 1 gal. |

Paint from 1 gal. water should be sufficient for 100–140 square ft. of skin.

The quantity of caustic soda chosen is dependent on the quality and thickness of the skins and the amount of paint applied to the skin; where skins contain appreciable amounts of fat as free fatty acid, usually indicated by their colour being darker, more caustic soda will be required, but the correct amount will be that which produces good depilation.

To prevent the skins, particularly when they are hung in the painted condition, swelling under dry conditions where water evaporates in appreciable quantities from the wool and skin, so causing the concentration of alkali in the skin to increase, the amount of sulphite should be increased to 4 or even to 8 ozs. per gallon. This prevents the sulphide from oxidising under these conditions, which helps to keep the paint moist, and the sulphite as a neutral salt suppresses the tendency for the skin to swell. The amount of sulphite needed is dependent on the amount of free iron present in the skin and sulphide, and the amount of the latter taken, and whether the skins are likely to dry out in the paint. If the paint when the skins are pulled has lost its blue/black colour on the flesh side of the skin, more sulphite is required.

With very fresh skins, as obtained from freezing works, it is also necessary to use rather more caustic soda than is necessary with less fresh skins and with very heavy sheep the amount may be as high as 2 lbs. to the gallon, and applied thickly to the heavier parts of the skin. By the use of these large quantities, it is possible to achieve good opening up of the pelt in a relatively short period and at the same time obtain better removal of the wool than by the normal lime sulphide process.

The paint can be applied to the skins by painting with brushes or by spraying.

To obtain the maximum advantage in the quality of the pelts produced from the dewooling process, it is necessary that the processing of the dewooled skins be performed so that full advantage is taken of the ability of sodium sulphide and caustic soda to remove unwanted protein matter from the skin.

After dewooling the skins should therefore be treated in a paddle or drum in a sodium sulphide solution containing sufficient salt to prevent any appreciable plumping of the skins. If a fresh liquor is prepared about 3–5% of common salt on the volume of the liquor must be added, and after the skins have been paddled for half an hour or so, sufficient sodium sulphide to bring the sulphide concentration up to 0.1 to 0.15 normal; the liquor then has a pH of about 12.0 at 18°–20° C. and at this pH the sulphide concentration is sufficient to dissolve any wool or hair left on the skins in 24 to 48 hours. If the liquor left is re-used it is essential to drain off after each lot any sludge; sufficient common salt and salts from the paint used in dewooling are usually left to make it unnecessary to add further common salt, but the sulphide concentration must be brought up to the right level; this usually maintains the pH at the correct level also, unless a very weak paint has been used, or unless the skins are not treated within 24 to 48 hours of painting.

Where a low sulphide content in the effluent is required, caustic soda is added to the paddle to bring the pH up to 12.5, and a paddle used which will aerate the liquor to oxidise the sulphide; the liquor is re-used leaving the sludge in as the keratinous matter in it will reduce the sulphide content; when the sulphide content has been reduced to about 0.01 normal the sludge can be run off as described in the previous paragraph, any adjustment of pH being by the addition of caustic soda.

To insure an even action on the skins, the skins are subjected to far more movement than is customary in lime liquors; it has been found that four hours' paddling over 24 hours in three 1½ to 2 hour periods is a minimum, while 60 hours' treatment in these conditions produces pelts which give leather of about equal substance to the pelts produced by the conventional lime/sulphide process, and the leather is flatter and of a more even substance over the whole area of the skin, especially in the neck.

It is believed that this is due to the complete removal of proteins other than collagen from the thicker parts of the skin, which with the more even treatment helps to produce level dyeing of the leather, and avoids the tanning material combining with the unwanted proteins and producing a drawn leather. By working at lower pH's than with lime liquors (pH 12.8 at 60° F.) the grain can be cleansed and a bright clear grain obtained without damage by abrasion, which is due to it being softened at the higher pH's. By not plumping the skin the tendency of wool sheep and lambskins to produce a loose leather is avoided, and the removal of the unwanted protein matter, which can be prevented by excessive plumping, is facilitated.

Alternatively slightly higher pH's can be used, for example 12.2 to 12.4, at 18°–20° C., with a sodium sulphide concentration as low as 0.05 N.

Where leather of the maximum substance is required, as when the skins are to be split, a period of treatment with alkali longer than 72 hours is required, and 1 week to 10 days should be given.

The subsequent treatment should follow conventional de-liming procedure. With caustic soda and sulphide treated skins there is no danger of lime blast, and ammonium sulphate or bates containing only this ammonium salt can be used at less cost. In pickling or de-liming with acid less acid will be required, and sulphuric acid can be used for the latter purpose to save expense.

With caustic soda liquors the skins will plump more than with lime, and if there are stale patches in the skin these will swell more than elsewhere. This is liable to cause damage if the skins are fleshed in the alkaline state and it is therefore preferable to flesh in the pickle. By giving a good bateing the damaged material is removed, and such skins then give a good satisfactory pickled skin.

I claim:

1. A composition for the depilation of animal skins by painting the flesh side of said skins, comprising a substantially lime-free, water soluble alkali from the group consisting of sodium hydroxide and potassium hydroxide, an accelerator for the alkali composed of a water soluble sulphide comprising not more than 3% of the composition by weight, an inhibitor for the oxidation of the sulphide comprising sodium sulphite in a concentration of not more than 2% of the composition by weight, and a promoter for the oxidation of the sulphide, said promoter containing finely divided ferric oxide present in a concentration of about half the concentration of the inhibitor, and said promoter being incapable of diffusion through the animal skin.

2. A composition according to claim 1 wherein the alkali is caustic soda, the sulphide is sodium sulphide, and the promoter is present in a concentration between ¼ and ½%.

3. A composition according to claim 1 including insoluble calcium carbonate as a thickener.

4. A composition according to claim 1 wherein the promoter is china clay.

5. A composition according to claim 4 and including starch.

6. A method of processing skins after dewooling in which said skins are treated in an alkaline solution comprising a water-soluble sulphide in a substantial concentration while the alkalinity of said solution is maintained at low level, said treatment including substantial mechanical movement such as paddling, said water soluble sulphide being sodium sulphide in a concentration between 0.05 N and 0.15 N, and the alkaline solution comprising caustic soda and having a pH of substantially 12.0° at 18°–20° C.

7. A method as claimed in claim 6 wherein said water soluble sulphide is sodium sulphide having concentration of .05 N, and the alkaline solution comprises caustic soda and has a pH of 12.4 at 18°–20° C.

8. A method as claimed in claim 6 wherein said treatment is continued for at least 24 hours.

9. A method as claimed in claim 6, wherein said mechanical movement is performed over a total period of 4 hours.

10. A method as claimed in claim 6 wherein said mechanical movement is performed in three periods each of 1½ to 2 hours' duration.

11. A method as claimed in claim 6, wherein said skins are first treated in a sodium sulphide solution containing sufficient common salt to prevent any appreciable plumping of the skins.

12. A dewooled and dehaired raw animal skin resulting from the treatment of said skin during the dehairing process with a composition consisting of a lime-free, water-soluble alkali from the group consisting of sodium hydroxide and potassium hydroxide, a relatively small percentage of water-soluble sulphide comprising not more than 3% of the composition by weight, a promoter for the oxidation of said sulphide at the surface, and a diffusable inhibitor for selectively inhibiting the oxidation of said sulphide at the hair roots, said inhibitor being present in a concentration of not more than 2% of said composition by weight and said promoter being present in a concentration of about half of the concentration of said inhibitor.

13. A processed animal skin as described in claim 12 wherein said alkali comprises caustic soda, said sulphide comprises sodium sulphide, said inhibitor comprises sodium sulphite, and said promoter comprises ferric oxide.

References Cited in the file of this patent

UNITED STATES PATENTS

| | | |
|---|---|---|
| 330,716 | Kennedy | Nov. 17, 1885 |
| 1,683,442 | Botson | Sept. 4, 1928 |
| 1,860,320 | Norlander | May 24, 1932 |
| 2,031,489 | Koenigsberger | Feb. 18, 1936 |
| 2,155,087 | Grassmann et al. | Apr. 18, 1939 |
| 2,775,504 | Zalcman | Dec. 25, 1956 |